UNITED STATES PATENT OFFICE.

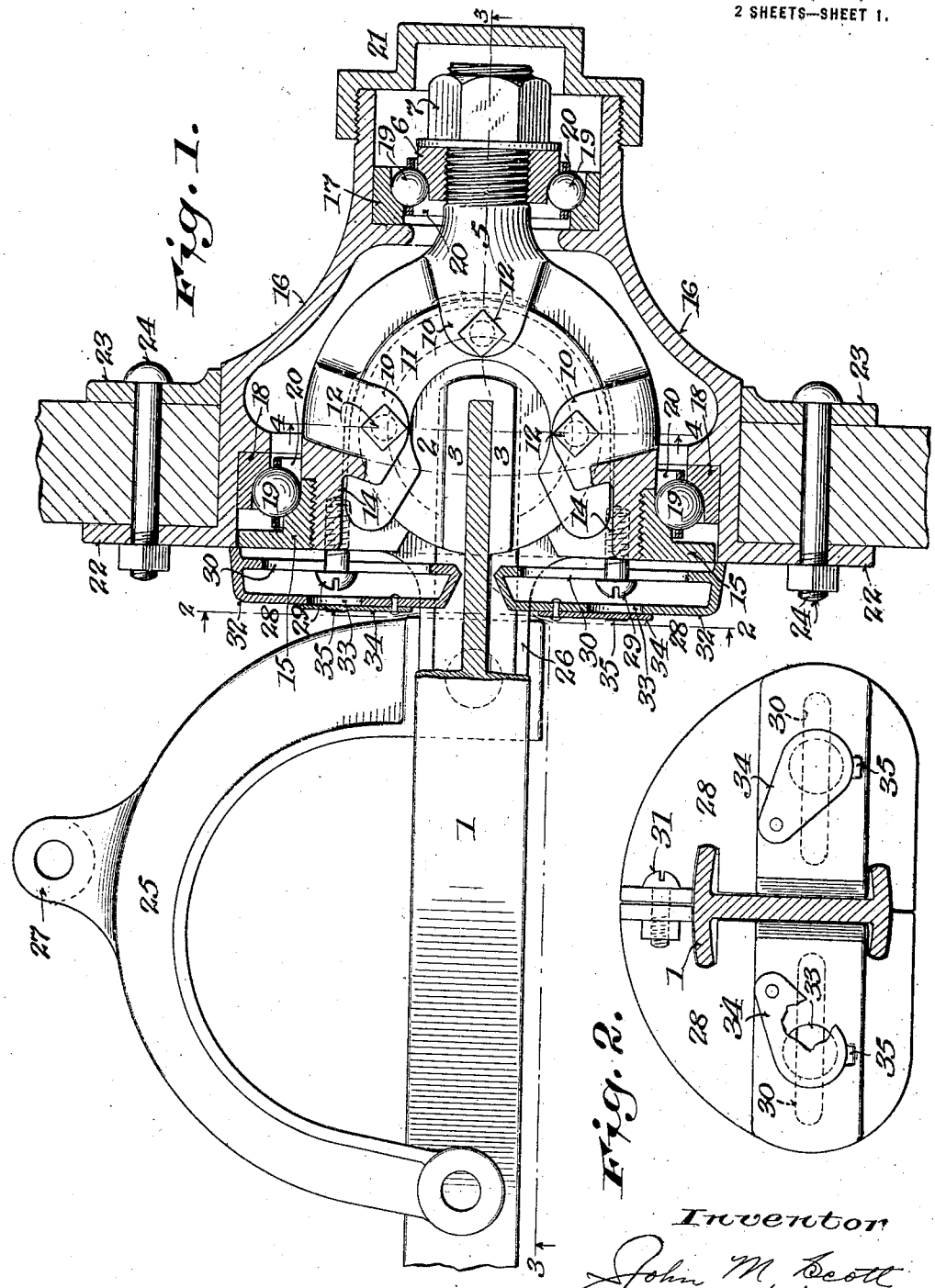

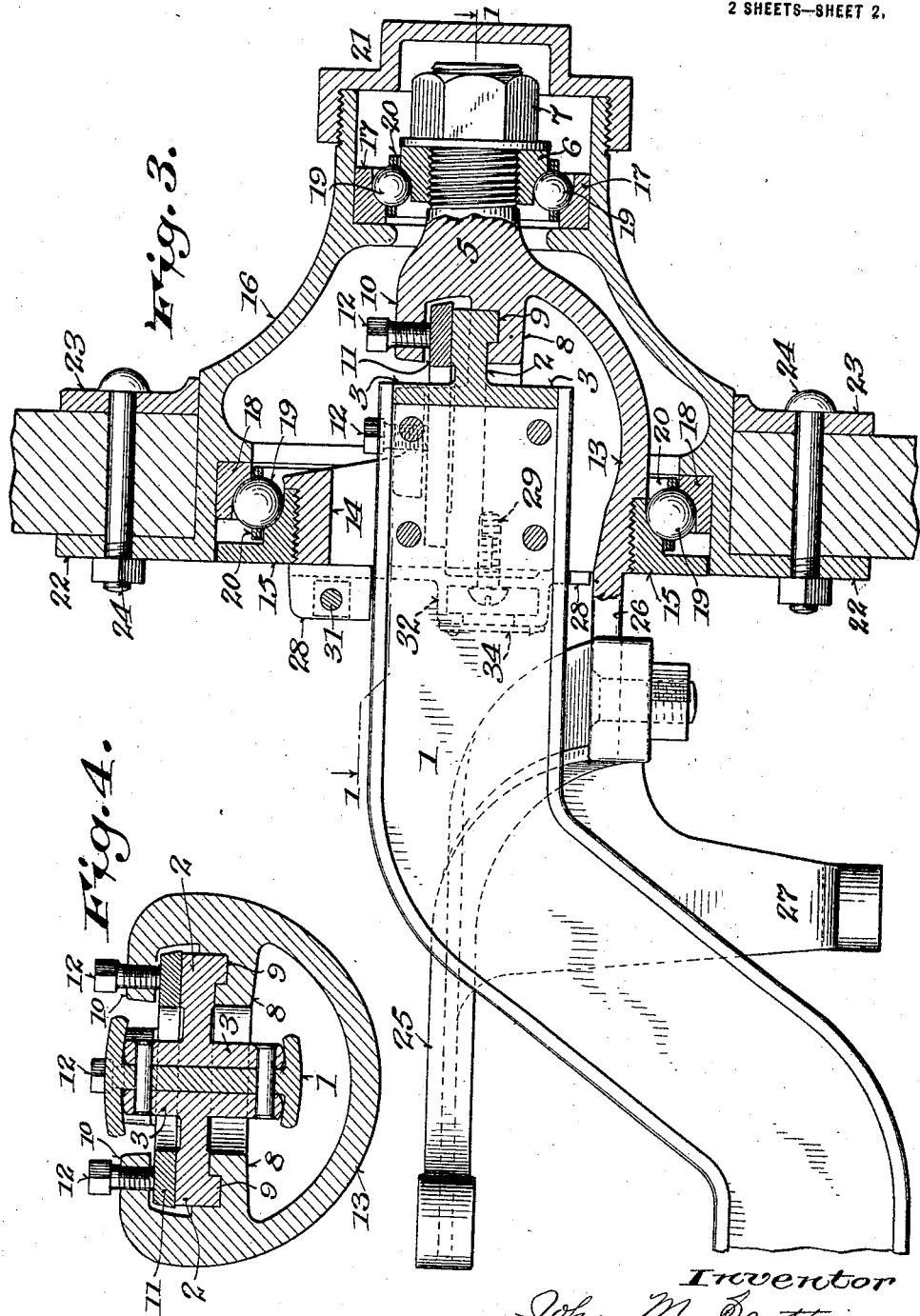

JOHN M. SCOTT, OF RACINE, WISCONSIN.

STEERING-KNUCKLE FOR AUTOMOBILES.

1,304,608.  Specification of Letters Patent.  Patented May 27, 1919.

Application filed June 12, 1916. Serial No. 103,052.

*To all whom it may concern:*

Be it known that I, JOHN M. SCOTT, a citizen of the United States, residing at Racine, in the county of Racine and State of Wisconsin, have invented certain new and useful Improvements in Steering-Knuckles for Automobiles, of which the following is a specification, reference being had to the accompanying drawing, forming a part thereof.

This invention relates to steering knuckles of the class shown and described in United States Letters Patent No. 1,153,961 issued to me September 21, 1915.

The main objects of the present invention are to provide for the adjustment of the bearings on which the wheel spindles turn horizontally to take up wear and play, to more effectively protect and exclude dust and dirt from said bearings, and generally to improve the construction and operation of steering knuckles of this class.

It consists in the construction, arrangement and combination of parts as hereinafter particularly described and pointed out in the claims.

In the accompanying drawings like characters designate the same parts in the several figures.

Figure 1 is a plan view and horizontal section, generally indicated by the broken line 1—1, Fig. 3, of a steering knuckle embodying the invention; Fig. 2 is a vertical cross section of the axle on the line 2—2, Fig. 1, and an elevation of the dust guard closing the inner end of the hollow wheel hub and protecting the knuckle bearings; Fig. 3 is a vertical section of the knuckle and associated parts, generally indicated by the broken line 3—3, Fig. 1; and Fig. 4 is a vertical cross section of the knuckle on the line 4—4, Fig. 1.

The axle 1, which is preferably of I- or T-section, as shown in Fig. 4, and formed as shown in Fig. 3, adjacent to the ends with drop bends, is provided at the ends with segmental or substantially circular bearings 2, which are transversely slotted to receive the axle web and are formed around the slots on the upper and under sides with flanges 3, which are bolted or riveted and brazed to the axle web and abut at their upper and lower edges against the top and bottom flanges of the axle.

The knuckles and wheel bearings at both ends of the axle being alike, but one of them is shown and will be described.

The wheel spindle 5, provided at its outer end with an adjustable ball bearing or race 6 and a nut 7, is formed at its inner end with a segmental bearing 8, fitted to turn or pivot on the bearing 2, preferably the under side thereof. One of these bearings, as the bearing 2, is formed with a marginal tongue 9, which fits into a corresponding groove in the opposing face of the other bearing, as the bearing 8, and holds said bearings concentric with each other when they are assembled as shown. The spindle 5 is also formed with a flange or ears 10, overhanging the bearing 8, at a distance therefrom, the ears being in effect a flange broken away at intervals, and the equivalent of a continuous flange. A segmental gib 11, fitting loosely between the upper face of the bearing 2 and the overhanging flange or ears 10, is held in adjustable engagement with said bearing by screws 12 threaded vertically through the flange or ears 10, and serves to take up wear and play between the knuckle bearings.

The spindle 5 is also formed below and part way around the bearing 8 with an extension 13, terminating at its inner end in a vertical ring 14, which surrounds the axle 1. On this ring is threaded or otherwise fastened an annular flanged ball bearing or race 15. The extension 13, curving upwardly at the sides, is formed integrally with the bearing 8, as shown in Fig. 4.

A hollow inwardly flaring wheel hub 16, provided with ball bearings or races 17 and 18, surrounds and partially incloses the spindle 5 and knuckle bearings, balls 19 held in spaced relation to one another by rings 20, being inserted between the spindle bearings or races 6 and 15, and the opposing hub bearings or races 17 and 18. The hub is provided at its outer end with a screw cap 21, which affords easy access to the nut 7 and the outer ball bearings. At its inner larger end the hub is formed with a fixed spoke flange 22, between which and a removable flange 23, the wheel spokes are fastened in the usual manner by bolts 24.

An upwardly, inwardly and rearwardly curved arm 25, bolted at its outer end to an inwardly projecting lug or arm 26 on the spindle extension 13, is connected at its inner end in the usual or any suitable manner, with the shaft of the steering wheel. The arm 25 is formed with a depending extension or branch 27, which is connected in the usual manner by a cross rod with a similar arm on the spindle of the steering knuckle at the opposite end of the axle.

The outwardly projecting flange on the ball bearing or race 15, fits closely but freely into the opening in the inner end of the hub 16, closing the annular space between the hub and the ring 14, and excluding dirt and dust therefrom.

The opening into the hub inside of the ring 14 is closed, and dirt and dust are excluded therefrom by a guard composed of sections 28, which are slidably and detachably connected with the inner end of the spindle extension 13 by screws 29 passing loosely through horizontal slots 30 in the guard sections and threaded in said extension. The guard sections are detachably connected with each other above the axle 1, by a bolt 31, and are cut away or formed in their adjoining edges with openings for the axle which passes through the guard. The guard sections are formed over the slots 30 with housings 32, in which holes 33 are formed for the insertion of the screws 29 and a screwdriver, when the spindle 5 is in its middle position in alinement with the axle 1, as shown in Fig. 1. The holes 33 are closed by covers 34 pivoted to the housings, which are formed or provided with stop lugs 35 to hold the covers in closed position, as shown in Fig. 2. The inner ends of the housings 28 are beveled, as shown in Fig. 1, to permit the guard to assume different angular positions when the spindle 5 is turned on the knuckle bearings, the guard sliding horizontally forward or backward on the screws 29 as the spindle with the wheel hub is turned into different positions.

Various modifications in the details of construction and arrangement of parts of the device may be made without departure from the principle and scope of the invention as defined in the following claims.

I claim:

1. In a steering knuckle the combination of an axle and a wheel-spindle member having horizontally disposed interfitting tongued and grooved segmental bearings, the spindle member being formed with a flange overhanging and spaced from the axle bearing, a segmental gib interposed between the flange and bearing of the spindle member, screws threaded in said flange and adapted to hold said gib in adjustable engagement with the upper face of the axle bearing and the axle bearing in engagement with the bearing on the spindle member, and a hollow wheel hub having ball bearings on the spindle member and forming with the spindle member a housing for said knuckle and ball bearings.

2. In a steering knuckle the combination of an axle and a wheel-spindle member having horizontally disposed interengaging segmental bearings, the spindle member having an inward extension terminating at its inner end in a ring which surrounds the axle, a hollow wheel hub rotatably mounted on the said spindle member and extending inwardly over the knuckle bearings and said ring, a ball race mounted on said ring and having an outwardly projecting flange closing the annular space between it and the inner end of the hub, and a dust guard slidably connected with the inner end of the spindle member, formed with an opening through which the axle freely passes, and closing the opening between the axle and said ring.

3. In a steering knuckle for automobiles the combination of an axle provided at the end with a horizontal segmental bearing, a wheel spindle having an inward extension and a segmental bearing fitted to turn on said axle bearing, a hollow wheel hub mounted on said spindle and surrounding said bearings, and a dust guard composed of horizontally slotted and detachably connected sections which are slidably and detachably connected with the spindle extension on opposite sides of the axle by screws passing through the slots in the guard sections and threaded in the spindle extension.

4. In a steering knuckle for automobiles the combination of an axle provided at the end with a horizontal segmental bearing, a wheel spindle having an inward extension and a segmental bearing fitted to and pivotally connected with said axle bearing, a hollow wheel hub mounted on the spindle and surrounding said bearings, and a dust guard composed of horizontally slotted sections slidably and detachably connected with the spindle extension by screws passing through the slots in the guard and threaded in said extension, the guard sections being formed over the slots with housings which are formed with holes affording access to the screws, and are provided with covers for closing said holes.

In witness whereof I hereto affix my signature in presence of two witnesses.

JOHN M. SCOTT.

Witnesses:
C. C. GITTINGS,
MARY E. LUNN.